Dec. 16, 1952 W. F. STEVENS 2,621,455
LAWN MOWER SHARPENING DEVICE
Filed Jan. 7, 1952
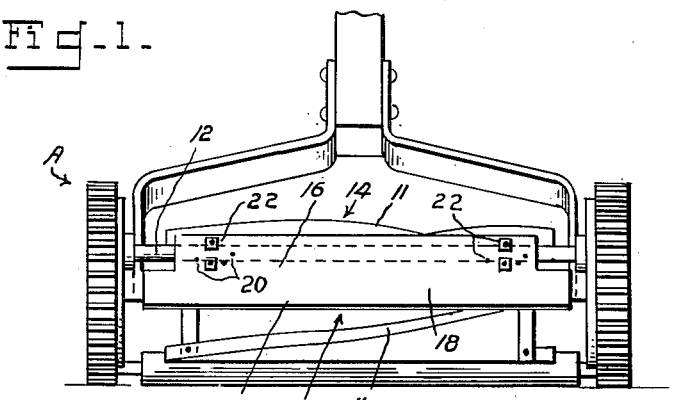
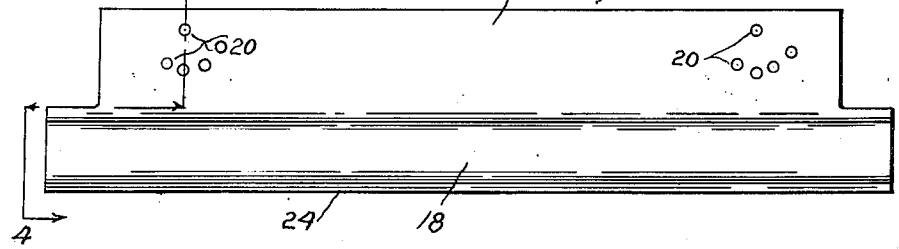
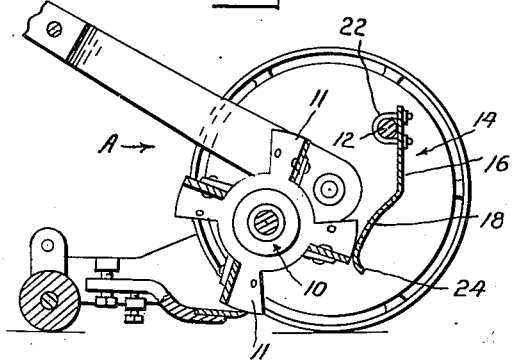
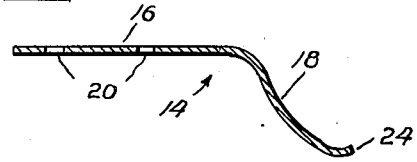
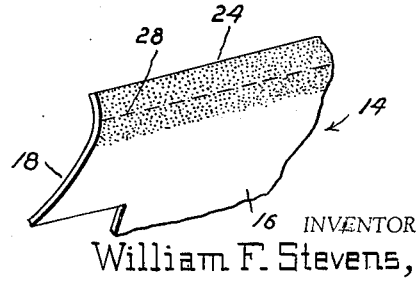
INVENTOR
William F. Stevens,
BY *Joseph G. Werner*
ATTORNEY Patented Dec. 16, 1952

2,621,455

UNITED STATES PATENT OFFICE 2,621,455

LAWN MOWER SHARPENING DEVICE

William F. Stevens, Madison, Wis., assignor to Ideas Incorporated, Madison, Wis., a corporation of Wisconsin Application January 7, 1952, Serial No. 265,276

2 Claims. (Cl. 51—250)

1

This invention relates to improvements in lawn mower sharpening devices and is concerned particularly with devices adapted for attachment to any conventional lawn mower of the reel type for maintaining the cutting edges in a sharp and serviceable condition.

An object of the invention is to provide a lawn mower sharpening device of the utmost simplicity in construction and characterized by a maximum of efficiency and durability which is designed to fit on all conventional sizes of lawn mowers.

A further object of the invention is to provide a lawn mower sharpening attachment which may be permanently positioned upon a mower without interfering with its cutting action and which may be adapted for blade sharpening operation upon minor adjustment whenever desired.

Another object of the invention is to provide a combined lawn mower sharpening device and reel blade guard adapted to push shrubs and flowers away from the cutting reel upon operation of the mower.

Other and further objects will be apparent from the following detailed description taken in conjunction with the accompanying drawings wherein a preferred embodiment of the principles of the invention has been selected for exemplification.

Fig. 1 is a front perspective view of a lawn mower with the handle broken away showing the sharpening device of the present invention secured to the mower in operative position;

Fig. 2 is a vertical sectional view of Fig. 1;

Fig. 3 is an enlarged plan view of the sharpening device shown in Fig. 1;

Fig. 4 is an end view partly in section taken on the line 4—4 of Fig. 3; and

Fig. 5 is a fragmentary perspective view of the sharpening device showing the scored working face.

Referring more particularly to the drawings wherein like numerals refer to like parts, a lawn mower of conventional type is indicated in its entirety by the letter A, such a mower having the usual cutting reel 10 having cutting blades 11 and a forwardly positioned transversely extending cross brace bar 12. The combined blade sharpening and guard device of the present invention is indicated in its entirety at 14 and is shown in Fig. 1 attached in operative position to the crossbar 12 of the mower A.

The attachment is formed preferably of a relatively heavy rigid sheet of metal, such as steel, which is bent along a line substantially medial of its length to provide an upright guard portion 16 and a depending arcuate portion 18. As shown, the upright portion 16 is provided adjacent its opposed ends with a series of apertures 20 each series being adapted to receive a U-bolt 22 to clamp the device 14 to the cross bar 12. As best shown in Fig. 2, a plurality of such apertures 20 is provided at each end so that the U-bolts 22 may be inserted through any selected pair in order tightly to clamp the device to a cross bar 12 of a variety of different cross sectional shapes and dimensions.

The upright portion 16 has a forward face of substantial area, protruding forwardly of the cutting reel 10, as shown, to provide a protective guard for pushing shrubs, flowers and the like away from the rotating cutting blades when the mower is in use.

The blade sharpening surface is provided by the convex face 24 of the arcuate portion 18, such convex sharpening surface being presented toward the cutting blades 11, as shown. It will be apparent that the sharpening surface can be readily adjusted with respect to the cutting blades 11 by positioning of the U-bolts 22 or by selective tensioning of the nuts in threaded engagement therewith.

While the scraping contact of the blades 11 with the bare surface 24 upon rotation of the reel 10 will effect sharpening action, it is advisable to employ an abrasive substance of any suitable character. To this end, the sharpening surface 24 or, if desired, the attachment 14 in its entirety may be coated as indicated at 26 with a suitable material, paint for example, which is adapted to be readily scored upon contact with the blades 11. Thus, when the device 14 is initially attached to a mower and the reel 10 rotated for initial contact of the blades 11 with the sharpening surface 24, the coating material 26 will be scored along such line of contact and the score line 28 thus produced will indicate the effective working area for application of the abrasive substance to the sharpening surface 24. In this manner only the minimum essential quantity of abrasive substance need be employed.

The use and operation of the device herein illustrated and described is believed readily apparent. It is preferred that after the device 14 has been positioned on the mower that U-bolt nuts be hand tightened and the arcuate portion 18 swung downwardly until the sharpening surface 24 thereof is forced tightly against one of the cutting blades 11 and the mower then pushed slightly so that the blade 11 will provide the score line indicated at 28. The U-bolt nuts may then be loosened and the device swung outwardly of the reel 10 for application of an abrasive substance to the scored portion 28 and the device then reclamped so that the convex surface 24 is positioned tangentially of the rotating path of the blades 11. Pushing of the mower on a smooth surface such as a sidewalk for several minutes and rotation of the blades 11 against the sharpening surface 24 is usually sufficient to provide a smooth sharp edge to the cutting blades. While the attachment 14 is intended to remain on the mower in the position shown during the grass cutting operation to provide a shrub and flower guard, it is desirable slightly to loosen the lowermost U-bolt nut so that the blades 11 will rotate free of contact with the surface 26 when grass is being mowed.

It will be understood that the present invention is not confined to the precise construction herein illustrated and described but embraces all such modifications thereof as come within the scope of the following claims.

I claim:

1. A sharpening device for a lawn mower having rotating cutting blades and a forward stationary cross-brace bar which comprises, a rigid metallic sheet having an upright top portion for attachment to said brace bar to support said sheet forwardly of said cutting blades, the said upright top portion having a front face of sufficient area to protect shrubs and flowers from the cutting blades when the mower is in operation, and a lower inwardly bent arcuate portion integral with said top portion and extending substantially the width of said cutting blades, the said arcuate portion presenting its convex face toward said cutting blades to provide a sharpening contact surface for said cutting blades, and adjustable means for attaching said sheet to said brace bar whereby to vary the contact between said cutting blades and said convex sharpening surface.

2. The device of claim 1 additionally including a coating of material carried by the convex sharpening surface and adapted to be scored upon initial rotating contact of the cutting edges of the blades with said surface, the score line thus produced indicating an area for application of an abrasive substance to said sharpening surface.

WILLIAM F. STEVENS.

REFERENCES CITED

The following references are of record in the file of this patent:

UNITED STATES PATENTS

| Number | Name | Date |
|---|---|---|
| 875,411 | Chesbro | Dec. 31, 1907 |
| 907,245 | Kenney | Dec. 22, 1908 |
| 1,092,021 | Chesbro | Mar. 31, 1914 |
| 1,128,716 | Orsie | Feb. 16, 1915 |
| 1,843,830 | Michalski | Feb. 2, 1932 |
| 2,084,799 | Garris | June 22, 1937 |